United States Patent Office 3,135,721
Patented June 2, 1964

3,135,721
METHOD OF PREVENTING REACTOR FOULING
Augustus B. Small, Westfield, N.J., and Lawrence Wesley McLean, Baton Rouge, La., assignors to Esso Research and Engineering Company, a corporation of Delaware
No Drawing. Filed Oct. 20, 1959, Ser. No. 847,456
5 Claims. (Cl. 260—80.7)

The present invention relates to the prevention of reactor fouling during the copolymerization of tertiary mixtures of isoolefins, diolefins and divinyl aromatic compounds in the presence of Friedel-Crafts type catalysts into rubbery tripolymers.

This is a continuation-in-part of U.S. application Serial No. 635,573, filed January 23, 1957 in the names of Augustus Bailey Small and Lawrence Wesley McLean, now abandoned.

These copolymerization reactions may only be run for a limited time because the internal surface of the reactor becomes fouled with the tripolymer formed. It is believed that the mechanism involved is that active catalyst adsorbs on the wall and copolymerizes the monomers to form a layer of tripolymer. When fouling occurs, the heat transfer coefficient of the reactor's internal surface decreases and the temperature within the reactor begins to increase. Furthermore, it has been noted that because excess catalyst is necessary to get the polymerization under way, fouling occurs at the highest rate during this period.

It has now been found that reactor fouling can be greatly reduced by having a low fouling rubbery copolymer solely of the isoolefin and the diolefin present during the start-up period. This rubbery isoolefin-diolefin polymer must be different from the rubbery tripolymer to be prepared in the reactor. Once the copolymerization into the tripolymer is under way, the production of the low fouling copolymer used in the start-up is discontinued concurrent with the introduction of the tripolymer feed. More particularly, according to the present invention, fouling during the production of isoolefin-diolefin-divinyl aromatic copolymers, is surprisingly reduced by starting up the reactor with the less fouling copolymer solely of the isoolefin and diolefin. It is believed that the copolymer solely of the isoolefin and diolefin in the reactor serves as an adsorbent for the active catalyst and substantially prevents it from reaching the reactor wall.

As stated before, copolymerizations coming within the scope of this invention are those of isoolefins with diolefins and divinyl aromatic compounds into rubbery tripolymers which foul the reactor particularly during the start-up period. These rubbery tripolymers are more commonly known as divinyl aromatic modified butyl rubber tripolymers.

Butyl rubber is a rubbery copolymer comprising a major proportion of a $C_4$ to $C_8$ isomonoolefin and a minor proportion of a $C_4$ to $C_{14}$ diolefin. The most satisfactory isomonoolefin is isobutylene, although other monoolefins such as 2-methyl butene-1, 3-ethyl pentene-1 or the like, preferably having between about 4 to 7 carbon atoms, may be used. The diolefins are generally conjugated aliphatic diolefins having about 4 to 14 carbon atoms, preferably about 4 to 8 or 10 carbon atoms. Suitable diolefins include, among others, isoprene, butadiene-1,3, dimethyl butadiene-1,3, piperylene and the like. The polymerization is generally carried out at a low temperature, advantageously between about 0° and —164° C. or —170° C., preferably between about —50° to —150° C., in the presence of a Friedel-Crafts catalyst, such as aluminum tribromide or especially aluminum trichloride, dissolved in a $C_1$ to $C_3$ alkyl halide, such as methyl chloride, ethyl chloride, etc. Butyl rubber has a Staudinger molecular weight between about 20,000 or 25,000 and 100,000 or 150,000 and an iodine number between about 0.5 or 1.0 and 50, preferably about 2 to 30.

The monomers most mommonly used are isobutylene and isoprene, although at times butadiene-1,3 is substituted for all or part of the isoprene. With butadiene, the mixture advantageously contains from about 70 to 90 parts of isobutylene with from about 10 to 30 parts of butadiene. With isoprene, the preferred range is from about 85 or 95 parts to 99.5 parts of isobutylene with from 0.5 to 5 or 15 parts of isoprene. Most of the multiolefins do not copolymerize into the polymer in exactly the proportion in which they are present in the mixture. With butadiene and isobutylene, approximately 20% of butadiene present causes the copolymerization of only about 1% of the butadiene into the copolymer, and accordingly, there is a change in relative concentration of butadiene and isobutylene as the reaction proceeds. Most of the other unsaturates show slightly different polymerization ratios, isoprene showing about as near a 1:1 ratio as any substance so far found.

In producing the tripolymer, the same isomonoolefins and diolefins are used together with a divinyl aromatic compound. The preferred compound is divinyl benzene, but such compounds as the alkyl-substituted dinvinyl benzenes, diisopropenyl benzene, and the divinyl naphthalenes are equally usable. The divinyl modifying agent is added to the isoolefin, diolefin or the reaction mixture in a proportion as small as 0.05 or 0.1% up to amounts as high as 8 or 10% based on the isomonoolefin.

To initiate the reaction it is necessary to use about 2 to 4 times the amount of catalyst needed to run the polymerization efficiently during the rest of the time the reactor is on stream. For instance, it may require 2000 lbs. of aluminum chloride catalyst solution to initiate the polymerization of 10,000 lbs. of monomer, while after the reactor has been onstream several hours the catalyst required may be as low as about 500 lbs. per 10,000 lbs. of monomer.

According to the present invention, the reactor is started up with a low fouling reaction mixture solely of isoolefin and diolefin and then it is switched to a feed comprising a mixture of the isoolefin, the diolefin and the divinyl aromatic compound. For instance, isobutylene may be copolymerized with isoprene in methyl chloride into a copolymer at a temperature of about —100° C., by adding a catalyst solution comprising 0.05 weight percent of aluminum chloride in methyl chloride to the monomers with vigorous stirring. After the reactor has been onstream for about ¼ to 10 hours, preferably for about ½ to 5 hours, the feed is cut off and a mixture of say isobutylene, isoprene and divinyl benzene is fed into the reactor. Within a few minutes (e.g., 25) the reactor will be operating efficiently and producing the desired tripolymer with little or no fouling because the first added copolymer reduces the induction period.

The concentration of the copolymer formed before producing the tripolymer, may be varied between about 5 or 8 and 25 or 30 weight percent of the reactor components, but it is preferred to have the reactor's polymer concentration between about 15 and 20 weight percent. The reduced temperature may be obtained by the direct admixture of a refrigerant-diluent such as liquid propane yielding about —40° C.; solid carbon dioxide yielding about —78° C.; liquid ethane yielding about —88° C.; or liquid ethylene yielding about —103° C. For an "internal refrigerant" it is essential that the refrigerant be free from any tendency to copolymerize, and free from any tendency to react with the catalyst.

The reduced temperature may also be obtained by a refrigerating jacket upon the reaction vessel. Any convenient refrigerant may be used in the reactor jacket including carbon dioxide, propane (especially under vacuum), ethane and ethylene, also under vacuum, or if desired, liquid methane, liquid nitrogen or liquid air, although, as a rule, these latter refrigerants yield lower temperatures than are necessary. In some instances, the fluoro-chloro-organic compounds known collectively under the trade name "Freon" are also usable, depending upon the desired temperature and the particular compound available. These fluoro-chloro-organic compounds are, in some instances, also usable as internal refrigerants.

The reaction may be conducted upon the mixed unsaturates alone or in the presence of from ½ to 10 volumes of the diluent which may be, as above pointed out, a refrigerant diluent, or a simple diluent, such as ethyl or methyl chloride, methylene or ethylene dichloride, chloroform, ethyl trichloride, or the like. In a continuous polymerization, the diluent may consist up to say about 20 volumes of diluent per volume of reactants under equilibrium conditions.

The catalyst used is a Friedel-Crafts active metal halide catalyst dissolved in a low-freezing, non-complex-forming solvent. The catalyst substance may be any of the well-known Friedel-Crafts catalysts, for instance, aluminum chloride, aluminum bromide, aluminum iodide, boron fluoride, double salts ranging in composition from aluminum dichloro-bromide to dialuminum pentabromo chloride, aluminum bromide-aluminyl bromide, titanium tetrachloride, titanium chloro acetate, hydroxylated aluminum halides, uranium tetrachloride, mixed alkylated aluminum halides, and other known active Friedel-Crafts compounds and their equivalents. Aluminum chloride is usually the preferred catalytic substance with aluminum bromide and titanium tetrachloride just about as satisfactory. Boron trifluoride in solution is satisfactorily usable with some of the diolefins.

For the catalyst solvent, it is only necessary that the solvent shall have a freezing point below 0° C. although it is usually convenient to use a catalyst solvent having a freezing point below the polymerization temperature. These requirements are met by any solvent which is low freezing, that is, having a freezing point below the freezing point of water. The preferred catalyst solvents with aluminum chloride are ethyl and methyl chloride, methylene or ethylene dichloride, chloroform, or occasionally, propyl chloride, carbon disulfide and/or sulfuryl chloride, or the like. With aluminum bromide or boron trifluoride the same solvents are advantageously usable and, in addition, the lower freezing hydrocarbons such as liquid propane, liquid ethane, liquid butane, liquid heptane, liquid hexane, and the like are also usable.

In order to more fully illustrate but not to limit the present invention, the following experimental data are given:

EXAMPLE 1

A 9 gallon capacity reactor was chilled to −97° C. and filled with cold methyl chloride. A feed composed of 97.3 weight percent of isobutylene and 2.7 weight percent of isoprene, this reactant feed being diluted with 5.5 parts by weight of methyl chloride per part of reactant feed, was introduced into the reactor at a rate of 1000 cc./minute. The methyl chloride catalyst solution, containing 0.09 percent aluminum chloride, was added at the rate of 60 cc./min. for 1 hour and then the rate was cut back to 36 cc./min. for the rest of the run. The polymer slurry concentration was 9 weight percent when the feed was switched to a mixture of 15 weight percent isobutylene, 3 weight percent isoprene (based on isobutylene) and 0.6 weight percent divinyl benzene (based on isobutylene) diluted with methyl chloride in an amount equivalent to the initial feed. The catalyst addition rate was increased to 53 cc./min. for the remainder of the run to give a higher production, 7.5 vs. 5.5 kg./hr., of polymer. No fouling was observed until after 6 hours.

However, when the same reactor was initially started up with the tertiary divinyl benzene-containing feed and no other added copolymer solely of isobutylene and isoprene was initially present in the reactor, excessive fouling was noted after only 1.5 hours.

EXAMPLE 2

The same general procedure as in Example 1 was repeated with the reaction conditions and resulting fouling times as shown in Table I.

Table I

100 LBS./DAY LTP PILOT PLANT OPERATION ON DIVINYL BENZENE MODIFIED BUTYL

| | Run A | Run B-1 | Run B-2 |
|---|---|---|---|
| | (Control) | (Of the Invention) | |
| Feed (weight percent): | | | |
| Divinyl benzene | 0.09 | | 0.09 |
| Isobutylene | 15.00 | 15.00 | 15.00 |
| Isoprene | 0.45 | 0.45 | 0.45 |
| Methyl chloride | 84.46 | 84.55 | 84.46 |
| Add'n. Rate, cc./Min | 1,000 | 1,000 | 1,000 |
| Catalyst: | | | |
| Concentration, g. AlCl₃/100 cc. MeCl | 0.06 | 0.04 | 0.04 |
| Add'n. Rate, cc./Min | 85 | 35 | 50 |
| Reactor: | | | |
| Slurry Conc | 1.8 | 9.0 | 12.0 |
| Conversion, (Wt. percent) | 13 | 62 | 84 |
| Temperature, ° F | −153 | −147 | −146 |
| Product: | | | |
| Prod. Rate, lbs./hr | 2.6 | 12.3 | 16.7 |
| Catalyst efficiency, lbs. Poly./Lb. AlCl₃ | 3,800 | 6,400 | 6,300 |
| Run time (Hrs.) | 1.5 | 4.5 | 2.5 |
| Remarks | (¹) | (²) | (³) |

¹ Fouling in reactor after 1.5 hours.
² Switched from regular feed to Divinyl benzene feed.
³ Fouling in reactor after 2.5 hours.

The above data show that by forming a tripolymer of isobutylene, isoprene and divinyl benzene initially in the presence of a preformed copolymer solely of isobutylene and isoprene, the production rate is surprisingly greatly increased from 2.6 to 16.7 pounds of tripolymer per hour, and the copolymerization time, before the reactor becomes fouled, is beneficially increased from 1.5 to 2.5 hours even at the above-mentioned tremendously increased production rate.

Resort may be had to modifications and variations of the disclosed embodiments without departing from the spirit of the invention or the scope of the appended claims.

What is claimed is:

1. In a continuous process of copolymerizing a $C_4$ to $C_8$ isoolefin, a $C_4$ to $C_{14}$ diolefin and a divinyl aromatic compound into a tripolymer in the presence of a Friedel-Crafts catalyst and a diluent having a freezing point below 0° C. at a temperature level of between about 0° and −170° C. whereby the tripolymer forms as a slurry in said diluent, the method of reducing fouling in the reactor during the starting up period which comprises first copolymerizing, in said reactor in the presence of a Friedel-Crafts catalyst, as the sole monomers, a $C_4$ to $C_8$ isoolefin and a $C_4$ to $C_{14}$ diolefin to a substantial quantity of copolymer other than said tripolymer, and thereafter copolymerizing said isoolefin with said diolefin and said divinyl aromatic compound in the presence of additional Friedel-Crafts catalyst continuously supplied to the said reactor to obtain a more fouling tripolymer than said copolymer solely of said isoolefin and said diolefin.

2. In a continuous process of copolymerizing isobutylene with isoprene and a divinyl aromatic compound into a tripolymer in the presence of a Friedel-Crafts catalyst and a diluent having a freezing point below 0° C. at a temperature between about 0 and −164° C. whereby the tripolymer forms as a slurry in said diluent, the method of reducing fouling in the reactor during the starting-up period which comprises first copolymerizing, in said reactor in the presence of a Friedel-Crafts catalyst, as the sole monomers, isobutylene and isoprene to a substantial quantity of copolymer other than said tripolymer, and thereafter copolymerizing said isobutylene with said isoprene and said divinyl aromatic compound in the presence of additional Friedel-Crafts catalyst continuously supplied to the said reactor to obtain a more fouling tripolymer than said copolymer solely of isobutylene and isoprene.

3. In a continuous process of copolymerizing isobutylene with isoprene and divinyl benzene into a tripolymer in the presence of an aluminum halide catalyst and a $C_1$ to $C_3$ alkyl halide diluent at a temperature level of between about $-50°$ and $-150°$ C. whereby the tripolymer forms as a slurry in said diluent, the method of reducing fouling in the reactor during the starting-up period which comprises first copolymerizing, in said reactor, in the presence of an aluminum halide catalyst as the sole monomers, isobutylene and isoprene into a substantial quantity of copolymer other than said tripolymer and thereafter copolymerizing said isobutylene with said isoprene and said divinyl benzene in the presence of additional aluminum halide catalyst continuously supplied to the said reactor to obtain a more fouling tripolymer than said copolymer solely of isobutylene and isoprene.

4. In a continuous process of copolymerizing about 0.5 to 15 parts by weight of a $C_4$ to $C_8$ conjugated diolefin, about 0.05 to 10 parts by weight of a divinyl aromatic compound and the remainder up to 100 parts by weight of a $C_4$ to $C_8$ isomonoolefin into a tripolymer in the presence of an aluminum chloride catalyst and a $C_1$ to $C_3$ alkyl chloride diluent at a temperature level of between about $-50°$ and $-150°$ C. whereby the tripolymer forms as a slurry in said diluent, the method of reducing fouling in the reactor during the starting-up period which comprises first copolymerizing, in said reactor in the presence of an aluminum chloride catalyst as the sole monomers about 0.5 to 15.0 parts by weight of a $C_4$ to $C_8$ conjugated diolefin and about 85 to 99.5 parts by weight of a $C_4$ to $C_8$ isomonoolefin to a substantial quantity of copolymer other than said tripolymer and thereafter copolymerizing said diolefin with said divinyl aromatic compound and said isomonoolefin in the presence of additional aluminum chloride catalyst continuously supplied to the said reactor to obtain a more fouling tripolymer than said copolymer solely of said diolefin and said isomonoolefin.

5. In a continuous process of copolymerizing about 15 parts of isobutylene, about 3 parts of isoprene, and about 0.6 parts of divinyl benzene into a tripolymer in the presence of a Friedel-Crafts catalyst and a methyl chloride diluent at a temperature level of between about 0° and $-164°$ C. whereby the tripolymer forms as a slurry in said diluent, the method of reducing fouling in the reactor during the starting-up period which comprises first copolymerizing, in said reactor in the presence of a Friedel-Crafts catalyst, as the sole monomers about 97.3 parts of isobutylene with about 2.7 parts of isoprene into a substantial quantity of copolymer other than said tripolymer, and thereafter copolymerizing said isobutylene with said isoprene and said divinyl benzene in the presence of additional Friedel-Crafts catalyst continuously supplied to the said reactor to obtain a more fouling tripolymer than said copolymer solely of isobutylene and isoprene.

References Cited in the file of this patent

UNITED STATES PATENTS

| 2,168,271 | Perquin | Aug. 1, 1939 |
| 2,474,807 | Schoene | July 5, 1949 |
| 2,516,683 | Dornte | July 25, 1950 |
| 2,671,774 | McCracken | Mar. 9, 1954 |

OTHER REFERENCES

Gaylord et al.: "Linear and Stereoregular Addition Polymers," pages 157–160, Interscience Publishers Inc., 1959.